United States Patent
Garimella

(10) Patent No.: US 9,400,955 B2
(45) Date of Patent: Jul. 26, 2016

(54) REDUCING DYNAMIC RANGE OF LOW-RANK DECOMPOSITION MATRICES

(71) Applicant: Amazon Technologies, Inc., Reno, NV (US)

(72) Inventor: Sri Venkata Surya Siva Rama Krishna Garimella, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 179 days.

(21) Appl. No.: 14/106,633

(22) Filed: Dec. 13, 2013

(65) Prior Publication Data

US 2015/0170020 A1 Jun. 18, 2015

(51) Int. Cl.
| | |
|---|---|
| *G06F 15/18* | (2006.01) |
| *G06N 3/08* | (2006.01) |
| *G06N 99/00* | (2010.01) |
| *G10L 15/16* | (2006.01) |

(52) U.S. Cl.
CPC .............. *G06N 3/082* (2013.01); *G06N 99/005* (2013.01); *G10L 15/16* (2013.01)

(58) Field of Classification Search
None
See application file for complete search history.

(56) References Cited

U.S. PATENT DOCUMENTS

| | | | | |
|---|---|---|---|---|
| 5,546,503 | A * | 8/1996 | Abe ..................... | G06K 9/6281 706/25 |
| 6,269,351 | B1 | 7/2001 | Black | |
| 2002/0169735 | A1* | 11/2002 | Kil ..................... | G06F 17/30539 706/46 |
| 2004/0181499 | A1 | 9/2004 | Corban | |
| 2008/0043873 | A1 | 2/2008 | Ariyavisitakul | |
| 2012/0150532 | A1* | 6/2012 | Mirowski ............... | G06F 17/28 704/9 |
| 2013/0138436 | A1 | 5/2013 | Yu et al. | |
| 2014/0372112 | A1* | 12/2014 | Xue ........................ | G10L 15/16 704/232 |

OTHER PUBLICATIONS

Xue, J., Li, J., & Gong, Y. (Aug. 2013). Restructuring of deep neural network acoustic models with singular value decomposition. In Interspeech (pp. 2365-2369).*

(Continued)

*Primary Examiner* — Stanley K Hill
*Assistant Examiner* — David H Kim
(74) *Attorney, Agent, or Firm* — Knobbe, Martens, Olson & Bear, LLP

(57) ABSTRACT

Features are disclosed for reducing the dynamic range of an approximated trained artificial neural network weight matrix in an automatic speech recognition system. The weight matrix may be approximated as two low-rank matrices using a decomposition technique. This approximation technique may insert an additional layer between the two original layers connected by the weight matrix. The dynamic range of the low-rank decomposition may be reduced by applying the square root of singular values, combining them with both low-rank matrices, and utilizing a random rotation matrix to further compress the low-rank matrices. Reduction of dynamic range may make fixed point scoring more effective due to smaller quantization error, as well as make the neural network system more favorable for retraining after approximating a neural network weight matrix. Features are also disclosed for adjusting the learning rate during retraining to account for the low-rank approximations.

28 Claims, 5 Drawing Sheets

(56) References Cited

OTHER PUBLICATIONS

Vanhoucke, Vincent, Andrew Senior, and Mark Z. Mao. "Improving the speed of neural networks on CPUs." Proc. Deep Learning and Unsupervised Feature Learning NIPS Workshop. vol. 1. 2011.*

David Cohn, Les Atlas, and Richard Ladner. 1994. Improving Generalization with Active Learning. Mach. Learn. 15, 2 (May 1994), 201-221.*

International Search Report and Written Opinion in PCT Application No. PCT/US2014/069485 dated Mar. 16, 2015.

* cited by examiner

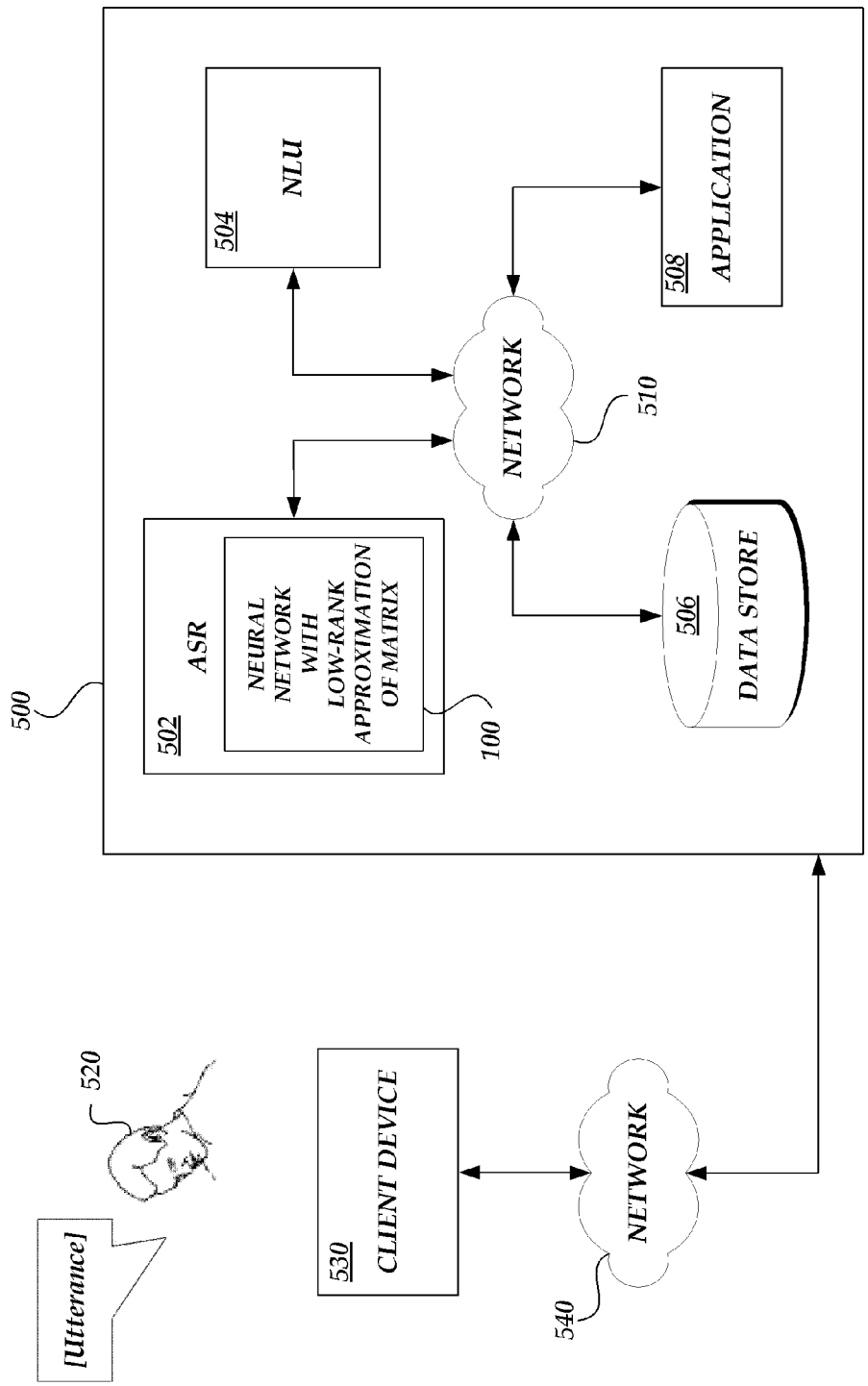

REDUCING DYNAMIC RANGE OF LOW-RANK DECOMPOSITION MATRICES

BACKGROUND

Computing devices can be used to process a user's spoken commands, requests, and other utterances into written transcriptions. Models representing data relationships and patterns, such as functions, algorithms, systems, and the like, may accept audio input (sometimes referred to as an input vector), and produce output (sometimes referred to as an output vector) that corresponds to the input in some way. In some implementations, a model is used to generate a likelihood or set of likelihoods that the input corresponds to a particular value. For example, an automatic speech recognition ("ASR") module may utilize various models to recognize speech, such as an acoustic model and a language model. The acoustic model is used on features of audio data to generate hypotheses regarding which words or subword units (e.g., phonemes) correspond to an utterance captured in the audio data. The language model is used to determine which of the hypotheses generated using the acoustic model is the most likely transcript of the utterance.

ASR modules commonly utilize Gaussian mixture models/hidden Markov models ("GMM/EIMM") for vocabulary tasks. However, artificial neural networks ("NN"), including deep neural networks, may also be used. Acoustic scores in NN-based ASR modules are obtained by doing an NN forward pass. The forward pass involves multiplying large trained NN weight matrices, representing the parameters of the model, with vectors corresponding to feature vectors or hidden representations. The output can be used to determine which subword unit (e.g., phoneme, phoneme portion, or triphone) is most likely to correspond to the input feature vector.

The parameters of an acoustic model can be set in a process referred to as training. An acoustic model can be trained using training data that includes input data and the correct or preferred output of the model for the corresponding input data. The model can be used to process the input data, and the parameters of the model can be modified until the model produces (or "converges" on) the correct or preferred output.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

FIG. 5 is a block diagram of an illustrative networked environment containing a spoken language processing system, showing illustrative interactions between a neural network-based automatic speech recognition module, a natural language understanding module, and a data store during processing of an utterance.

DETAILED DESCRIPTION

Introduction

Figure 1:
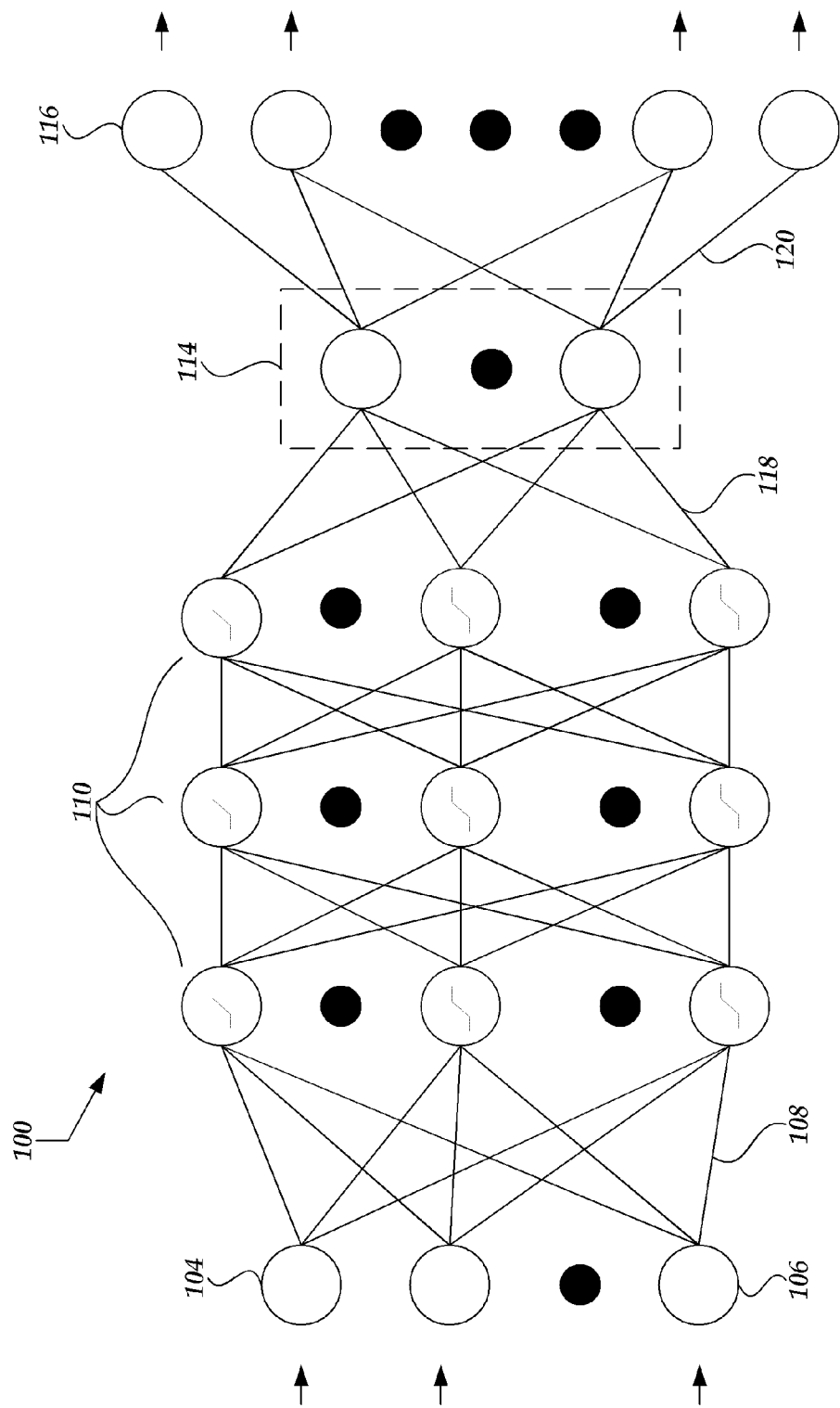
FIG. 1 is a block diagram of an illustrative neural network containing several non-linear hidden layers and a decomposed matrix.

The present disclosure is directed to improving the speed of neural network-based automatic speech recognition while maintaining a satisfactory level of accuracy. Methods of training the improved neural networks are also disclosed. Generally described, an automatic speech recognition ("ASR") process may be implemented by a number of processing modules or components that obtain audio data input regarding an utterance and generate a sequence of recognized words, e.g. a transcription, as output. Some ASR systems may use an artificial neural network, also referred to herein as a neural network for convenience, as an acoustic model. A neural network is a network containing at least one computational unit, also known as a neuron or node, interconnected to other computational units. Conceptually, the nodes may be thought of as calculating the output values as a function of a plurality of different input values. Typically, neural networks have multiple (e.g., two or more) layers of nodes, and nodes of adjacent layers may be connected to each other. Each connection between the various nodes of adjacent layers may be associated with a respective weight. When processing audio data input in the form of a vector (e.g., one or more feature vectors containing information extracted from portions of the audio data), a neural network may first multiply each input vector by a matrix representing the weights associated with connections between the input layer and a subsequent layer.

A neural network, including, for example, a deep neural network, utilized in an ASR module may contain several layers, including an input layer, an output layer, and several non-linear hidden layers. In speech recognition, the input stage may consist of a set of parameters (e.g., a feature vector) for a given input frame along with parameters for frames preceding and following the input frame. Acoustic scores may be obtained by doing a forward pass. The forward pass involves multiplying large matrices representing the connection weights between nodes of adjacent layers by vectors corresponding to one or more feature vectors (from the input layer) or hidden representations (from the subsequent hidden layers). In some cases, hidden layers and/or the output layer may include thousands of nodes. Matrices representing weights connecting such layers can get quite large (e.g., a matrix of size 3,000×1,000 has 3,000,000 values). Due to these large matrices, the acoustic scoring process can be time-consuming and resource intensive. Approximation of these large matrices reduces the number of multiplications and hence may speed up the forward pass.

Aspects of the present disclosure are directed to the creation of low-rank approximations of neural network weight matrices using singular value decomposition, and, more specifically, to the transformation of these low-rank matrices by using a rotation matrix to reduce their dynamic range. The low-rank approximation reduces the number of multiplications and may therefore significantly speed up the neural network forward pass. For example, a matrix representing connection weights between two layers each having 1,000 nodes will have 1,000,000 weights (a matrix of size 1000×1000). The neural network will multiply such matrices by a vector (e.g., the input vector or some hidden representation) of an appropriate size (e.g., a 1,000-dimensional vector in this case) in a process involving a large number of individual multiplications. By replacing the large matrix with a low-rank approximation consisting of two low-rank matrices, the number of individual multiplications may be reduced accordingly. This approximation technique may insert an additional layer between the two original layers. The first low-rank matrix of the low-rank approximation represents the weights between the original first layer and the additional layer and the second low-rank matrix represents the weights between the additional layer and the original second layer. If the low-rank approximation is factored into two component matrices, a rotation matrix may be used to reduce the dynamic range of the low-rank matrix values. Reducing the dynamic range of the low-rank matrices can provide several benefits, including more effective quantization of values due to a small quantization error. Additional benefits include facilitation of more efficient training. One training technique known as back propagation is typically slow to converge when there is a larger dynamic range.

Additional aspects of the present disclosure relate to retraining the neural network after one or more of the matrices have been replaced by the low rank approximations described above and in greater detail below. The low-rank approximation of the neural network matrix may, in some cases, increase the word error rate ("WER") of the resultant neural network. This WER degradation may be recovered by retraining the approximated neural network model. In some embodiments, retraining may make the approximated model even more accurate than it was prior to replacing a matrix with the low rank approximation. The learning rate may be adjusted during the retraining procedure in order to accommodate low-rank linear approximations. These approximation and retraining techniques may be applied to any stage of the neural network, but may produce the greatest results when applied to the final hidden layer as it may involve the largest neural network matrix. These techniques may be used, for example, in the training of an acoustic model, but are not limited to such. In some embodiments, the techniques may be used to improve training of any neural-network based model.

With reference to an illustrative embodiment, a neural network may include a trained NN matrix, $W_{m \times n}$. The trained matrix may be approximated using the product of two low-rank matrices. This approximation introduces into the neural network an additional layer of smaller size while reducing the total number of parameters in the matrix. These two low-rank matrices are obtained by first using singular value decomposition ("SVD") on $W_{m \times n}$, e.g., $$W_{m \times n} = U_{m \times n} \Sigma_{n \times n} V_{n \times n}^T \qquad [1]$$

where U is an m×n real unitary matrix, Σ is an n×n rectangular diagonal matrix with nonnegative real entries on the diagonal, and $V^T$ the transpose of V. The matrix $W_{m \times n}$ may be further simplified by taking the r largest values from Σ, where r is less than or equal to m or n. The matrix may then be approximated as the least squares approximation of W, with the singular value decomposition rewritten as the product of low-rank matrices, $$\tilde{W} = \tilde{U}_{m \times r} \tilde{\Sigma}_{r \times r} \tilde{V}_{r \times n}^T \qquad [2]$$

$$\tilde{W}_{m \times n} = \tilde{U}_{m \times r} \tilde{\Sigma}_{r \times r}^{1/2} \tilde{\Sigma}_{r \times r}^{1/2} \tilde{V}_{r \times n}^T \qquad [3]$$

These low-rank matrices may be further transformed by inserting a rotation matrix. This rotation matrix, R, where $RR^T$ is equal to an identity matrix, may reduce the dynamic range of the matrix by compressing the minimum and maximum values of the low-rank approximations. Such a reduction may be desirable for several reasons. First, reducing the dynamic range of the matrix may aid in retraining the neural network after this approximation. Otherwise, if the dynamic range is large, the back propagation training will be slow to converge. Secondly, it may be useful when applying subsequent fixed-point scoring or fixed-point approximations.

The trained NN matrix, $W_{m \times n}$, may have some corresponding bias vector $b_{m \times 1}$ to be accounted for. The approximation of the NN matrix as the product of two low-rank matrices may be viewed as adding a layer to the NN system. For example, assume the system is moving from the input layer to the first hidden layer. Since W may now be approximated as the product of two low-rank matrices, the bias vector may not be applied to the matrices until the system reaches the first hidden layer in order to maintain the proper equivalency.

The original trained NN matrix may only have non-linear sigmoid hidden layers, which forces the dynamic range of all hidden outputs to be between some predetermined range, such as (0, 1). However, the above approximation introduces an intermediate hidden layer, linear in nature, where the dynamic range of the output is no longer restricted to be between (0, 1) and may instead be higher or lower. Further, the approximated NN model may need to be retrained in order to recover from WER degradation. As described above, the reduced dynamic range of the low-rank matrices can improve the speed of training using back propagation.

One method of training models may use stochastic gradients. In stochastic gradient training, a modification to each parameter of a model may be based on the error in the output produced by the model. A derivative, or "gradient," can be computed that corresponds to the direction in which each individual parameter of the model is to be adjusted in order to improve the model output (e.g., to produce output that is closer to the correct or preferred output for a given input). The average variance per node at the output of the intermediate hidden linear layer may be estimated by assuming a fixed variance at each previous non-linear hidden output. While the system may have different learning rates (corresponding to the amount by which the parameters are to be adjusted during each individual adjustment) for different stages of training, the same learning rate may often be applied to all stages for simplicity and to limit the number of parameters needed. The learning rate of the non-linear layer following the intermediate hidden layer may be adjusted so that the dynamic range of the resultant gradient matches that of the original NN system in order to account for the linear layer.

Although the examples and embodiments described herein will focus, for the purpose of illustration, on approximating NN weight matrices for use in automatic speech recognition, one skilled in the art will appreciate that the techniques described herein may be applied to other processes, methods, or systems. For example, the techniques may be used with any type of neural network, for NNs used for purposes other than automatic speech recognition, etc. Various aspects of the disclosure will now be described with regard to certain examples and embodiments, which are intended to illustrate but not limit the disclosure.

Sample Neural Network with Decomposed Matrix

FIG. 1 depicts an illustrative deep neural network 100 containing several non-linear hidden layers 110. An NN 100 contains an input layer 104 that corresponds to a set of input vectors or feature vectors. The input layer 104 may consist of a set of parameters for a given acoustic frame, as well as for parameters of frames preceding and following the input frame. These input vectors are processed using the NN 100 and are output transformed as output vectors. The output layer 116 may consist of a set of nodes 106, each associated with a respective word or subword unit (e.g., phoneme, phoneme portion, triphone, etc.). The output indicates which subword likely corresponds to the input. The output layer may be linear or non-linear.

In one specific, non-limiting example, the input layer may contain one hundred eighty nodes or neurons 106, while the output layer may contain three thousand nodes. Between the input and output layers are several hidden non-linear layers 110. Though the number of non-linear hidden layers 110 may be any number, typically in speech recognition the number of hidden layers may vary between three and seven. In addition, each layer may consist of a few thousand units. As a result, an NN model may have many more parameters (e.g., two to ten times more parameters) than a traditional GMM/HMM model.

Certain hidden layers 110 are connected to the adjacent input or output layers 104, 116. Each node 106 may be connected to a node 106 in the following layer by some weighted connection 108. The weighted connections 108 between the layers may be described by the weight matrices in the NN-based ASR system. These weight matrices may be necessary to process information through the ASR system. Since each node may correspond to a node in the next layer, the NN may require a great number of calculations to process information.

In an NN-based ASR system, the lower layers of NN may be shared across all units in the output layer. The lower layers may need to be calculated even though only a small amount of states are active during search. Therefore, it may be necessary to reduce the NN model size by approximating the weight matrices in order to obtain fast computation and lessen memory usage.

Layer 114 represents an intermediate linear layer that replaces a large weight matrix in the NN when decomposing the large matrix into two low-rank matrices. This decomposition introduces into the neural network an additional layer of smaller size while reducing the number of parameters in the matrix. As a result, the large matrix representing weights corresponding to connections between output layer 116 and the adjacent (e.g., immediately preceding) hidden layer 100 have been replaced by two weight matrices. One of the new low-rank matrices corresponds to the connections between the last hidden layer 110 and the intermediate layer 114 (e.g., connection 118), and the second low-rank matrix corresponds to the weights between the intermediate layer and the output layer 116 (e.g., connection 120). This approximation may be performed at any stage of the NN. It may be most desirable to perform this weight matrix approximation directly before the output layer 116, however, because that weight matrix may be the largest. Advantageously, the two low-rank matrices may be calculated using a rotation matrix that reduces the dynamic range of the low-rank matrices.

Weight Matrix Approximation

Figure 2:
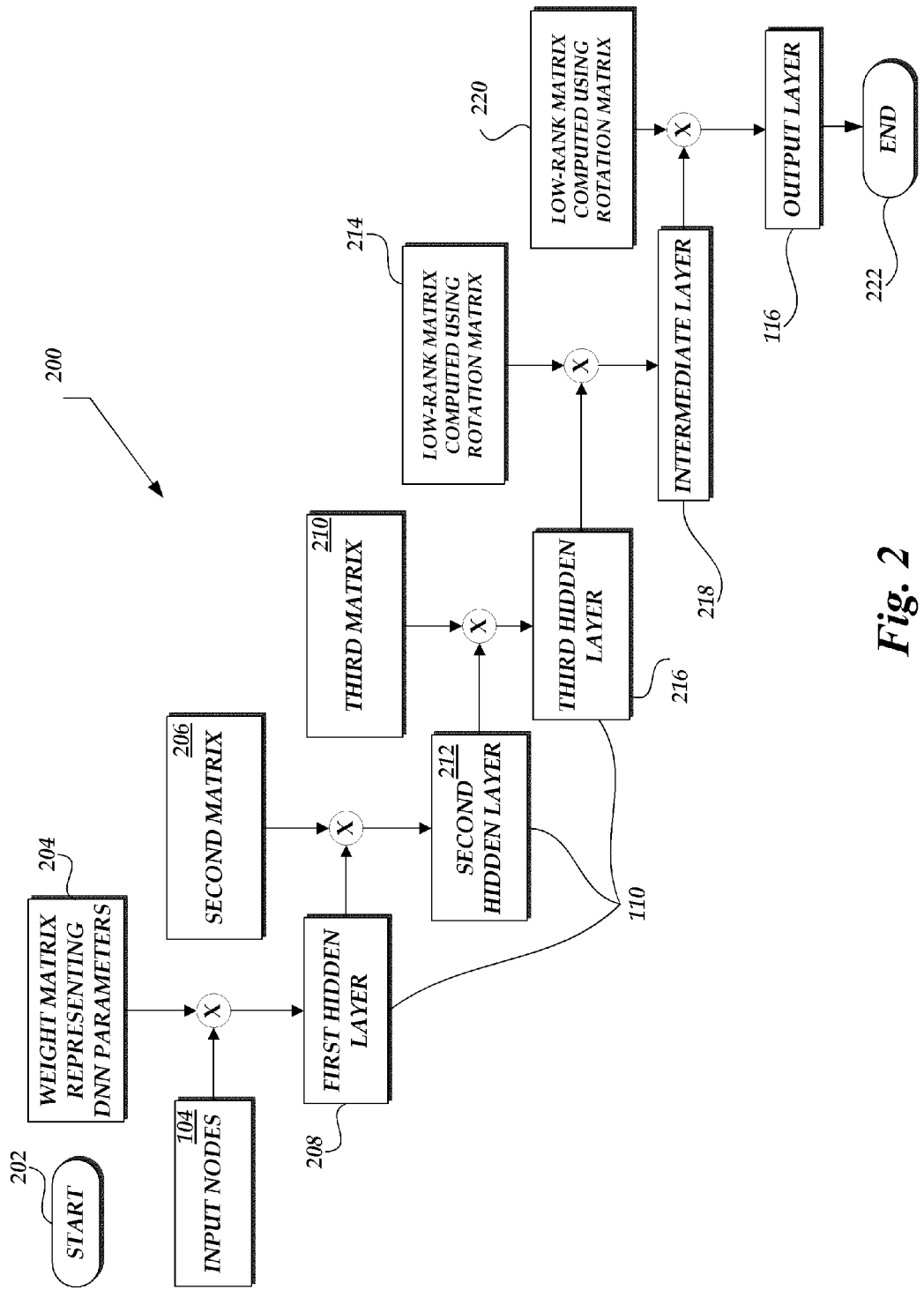
FIG. 2 is a block diagram of an illustrative process for obtaining acoustic scores in a neural network by doing a forward pass.

FIG. 2 depicts an illustrative forward pass 200 through an NN 100. This illustration depicts an NN 100 with an input layer 104, an output layer 116, and three hidden layers 110, but one skilled in the art will appreciate that the techniques described herein are not limited to this number of layers or the illustrative layer sizes.

The process begins at block 202. The input layer 104 is represented by a series of nodes 106. For example, the number of nodes 106 in the input layer 104 may be one hundred eighty. The first hidden layer 208 may contain, for example, one thousand nodes 106. In order to move to the first hidden layer, the NN weight matrix 204 can be multiplied by the input layer 104. For example, the NN weighted matrix 204 may be a 1000×180 matrix, multiplied by the input layer 104. This can result in the first hidden layer 208, which may be represented by a 1000-dimension vector (or 1000×1 matrix) corresponding to the one thousand nodes 106. In some embodiments, a sigmoid non-linearity function may be applied to scale the values of the vector between some predetermined range (e.g., 0-1). Such non-linearity may also be applied for some or all of the subsequent hidden layers.

To move from the first hidden layer 208 to the second hidden layer 212, the connections between the layers 208 and 212 may be represented by a 1000×1000 matrix 206. The weight matrix 206 may be multiplied by the first hidden layer 208, producing the second hidden layer 212. The second hidden layer may, for example, be represented by a 1000-dimension vector (or 1000×1 matrix).

The process may be similarly repeated in order to move from the second hidden layer 212 to the third hidden layer 216. The weight matrix 210 may be multiplied by the second hidden layer 212 to produce the third hidden layer 216. For example, connections between the layers 212 and 216 may be represented by a 1000×1000 matrix 210 and the third hidden layer may again be represented by a 1000-dimension vector (or 1000×1 matrix).

To produce the final output layer 116, the low-rank matrices 214 and 218, computed using rotation matrices as described in greater detail below, may be used. Illustratively, a first low-rank matrix 214 may be multiplied by the third hidden layer 216 to produce an intermediate hidden layer 218. The intermediate hidden layer 218 may then be multiplied by a second low-rank matrix 220 to produce the output layer. Each of the low-rank matrices may be substantially smaller than the matrix that would normally be used to produce the output layer from the last hidden layer. For example, a weighted matrix used to produce a 3000-dimension vector from a 1000 node hidden layer may be represented by a 3000×1000 matrix. This produces an output layer 116 of three thousand nodes. In contrast, a first low-rank matrix of size 180×1000 and a second low-rank matrix of size 3000×180 may be used, thereby substantially reducing the number of multiplications to be computed (e.g., 720,000 vs. 3,000,000). The process ends at block 222.

Figure 3:
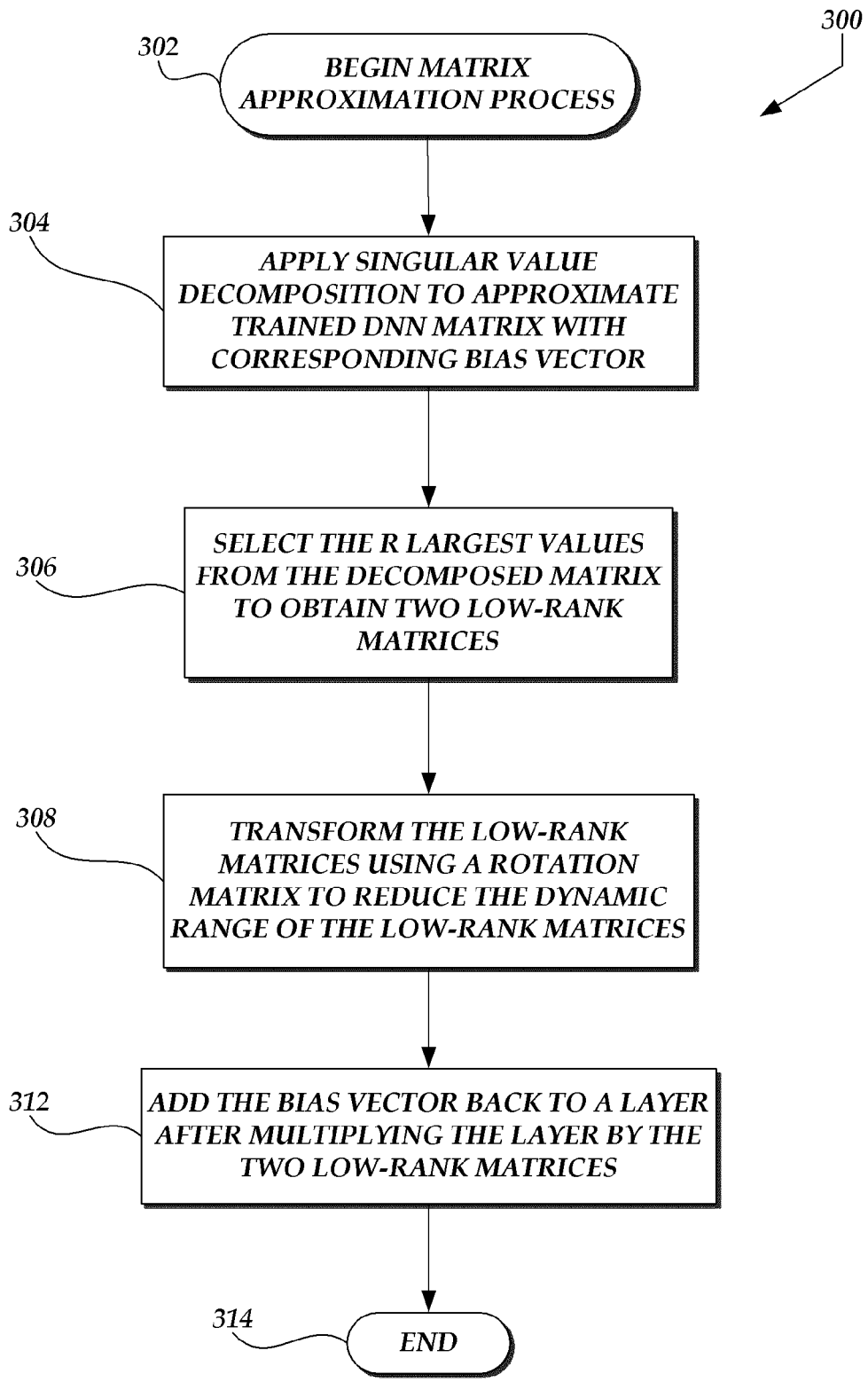
FIG. 3 is a flow diagram of an illustrative process for approximating a trained neural network matrix to speed up execution of a forward pass while keeping the dynamic range of the low-rank approximations small.

With reference now to FIG. 3, an illustrative process 300 for approximating a trained NN weight matrix, $W_{m \times n}$, where m is greater than n, may be described. Approximating a trained NN weight matrix as the product of two low-rank matrices may be viewed as adding in another constraint or hidden layer to the NN system 100, though one of smaller size. The process begins at block 302. The process may be embodied in a set of executable program instructions stored on a computer-readable medium, such as one or more disk drives, of a computer system. When the process 300 is initiated, the executable program instructions can be loaded into memory, such as RAM, and executed by one or more processors of the computer system.

A trained NN matrix with a corresponding bias vector may be approximated in order to reduce the number of multiplications involved in processing an NN forward pass to achieve an acoustic score. The trained NN matrix may be approximated at block 304 utilizing a singular value decomposition technique.

In this technique, the trained NN matrix may be decomposed into lower-dimensional matrices as demonstrated below.

$$\begin{bmatrix} w_{11} & \cdots & w_{1n} \\ \vdots & \ddots & \vdots \\ w_{m1} & \cdots & w_{mn} \end{bmatrix} = \begin{bmatrix} u_{11} & \cdots & u_{1n} \\ \vdots & \ddots & \vdots \\ m_{m1} & \cdots & u_{mn} \end{bmatrix}. \quad [4]$$

$$W_{m\times n} = U_{m\times n}\begin{bmatrix} \varepsilon_{11} & \cdots & 0 & \cdots & 0 \\ \vdots & \ddots & \vdots & \ddots & \vdots \\ 0 & \cdots & \varepsilon_{rr} & \cdots & 0 \\ \vdots & \ddots & \vdots & \ddots & \vdots \\ 0 & \cdots & 0 & \cdots & \varepsilon_{nn} \end{bmatrix} \cdot \begin{bmatrix} v_{11} & \cdots & v_{1n} \\ \vdots & \ddots & \vdots \\ v_{m1} & \cdots & v_{mn} \end{bmatrix}$$

$$W_{m\times n} = U_{m\times n}\Sigma_{n\times n}V_{n\times n}^T.$$

By applying singular value decomposition, $W_{m\times n}$ may be rewritten as shown. In the above decomposition, first component matrix $U_{m\times n}$ may be a unitary matrix, second component matrix $\Sigma_{n\times n}$ may be a diagonal matrix with positive values greater than or equal to zero, and third component matrix $V^T$ may be the transpose of V, a unitary matrix. The m columns of U and the n columns of V may be called the left-singular vectors and the right-singular vectors of W, respectively. Since W may be a sparse matrix, a large part of W's singular values may be very small.

At block 306, the r largest values may be selected from the now decomposed NN matrix. When selecting r, r may be the low-rank of the resultant least squares approximation, $\tilde{W}_{m\times n}$. For example, r may be set as 128, leaving only the 128 highest values in $\Sigma$. All smaller values may be set to 0 without significantly changing the values of elements in the trained NN matrix. Thus, U and $V^T$ may also be approximated. In $V^T$, only the first r rows may be selected for the resultant least squares approximation. For example, if m is 1,000, n is 3,000, and r is selected to be 128, only 128 rows of $V^T$, e.g., a portion of $V^T$, can be selected. Further, since $\Sigma$ has only positive entries, the square root of $\Sigma$ may be taken. The equation may then be rewritten as $$\tilde{W}_{m\times n} = \tilde{U}_{m\times r}\tilde{\Sigma}_{r\times r}\tilde{V}_{r\times n}^T \qquad [2]$$

$$\tilde{W}_{m\times n} = \tilde{U}_{m\times r}\tilde{\Sigma}_{r\times r}^{1/2}\tilde{\Sigma}_{r\times r}^{1/2}\tilde{V}_{r\times n}^T \qquad [3]$$

This can be further rewritten at block 308 as $$\tilde{W}_{m\times n} = (\tilde{U}_{m\times r}\tilde{\Sigma}_{r\times r}^{1/2}R_{r\times r})(R_{r\times r}^T\tilde{\Sigma}_{r\times r}^{1/2}\tilde{V}_{r\times n}^T) \qquad [7]$$

where $\tilde{\Sigma}_{r\times r}$ represents a diagonal r×r matrix with r largest values from $\tilde{\Sigma}_{r\times r}$, $\tilde{U}_{m\times r}$ represents the corresponding columns of $U_{m\times n}$ and $\tilde{V}_{r\times n}^T$ represents the corresponding rows of $V_{n\times n}^T$. Thus, $\tilde{U}_{m\times r}$ may represent a portion of matrix $U_{m\times n}$, $\tilde{\Sigma}_{r\times r}$ may represent a portion of matrix $\tilde{\Sigma}_{r\times r}$, and $\tilde{V}_{r\times n}^T$ may represent a portion of $V_{n\times n}^T$. By keeping the singular values proportional to the total in each layer, NN model size may be significantly reduced. More aggressive model compression may cause a greater drop in word accuracy.

Further, $R_{r\times r}$ may be a rotation, e.g., unitary, matrix. In some cases, R may be a randomly generated matrix. By approximating the original trained NN matrix using a rotation matrix, the dynamic range of the low-rank matrices $A_{r\times n}$ 220 and $B_{m\times r}$ 214 in equations [8], [9] and [10] below may be reduced. $A_{r\times n}$ 220 may represent the right parenthetical of the above approximation, $$A_{r\times n} = (R_{r\times r}^T\tilde{\Sigma}_{r\times r}^{1/2}\tilde{V}_{r\times n}^T) \qquad [8]$$

and $B_{m\times r}$ 214 may represent the left parenthetical, $$B_{m\times r} = (\tilde{U}_{m\times r}\tilde{\Sigma}_{r\times r}^{1/2}R_{r\times r}) \qquad [9].$$

The rank of low-rank matrix $A_{r\times n}$ 220 and the rank of low-rank matrix $B_{m\times r}$ 214 may be less than the rank of the original matrix W. W was originally, for example, a 3000×1000 matrix and may now be approximated as the product of a 3000×128 matrix and a 128×1000 matrix, both of which are rank r.

The original NN affine component may be approximated as the product of two affine components, where $0_{r\times 1}$ represents a vector of zeros, $$[W_{m\times n}|b_{m\times 1}] \approx [B_{m\times r}|b_{m\times 1}][A_{r\times n}|0_{r\times 1}] \qquad [10].$$

The bias vector $b_{m\times n}$ may then be added back to a layer after multiplying the layer by the two low-rank matrices as shown at block 312. The bias vector may be thought of as a parameter of the NN system when the corresponding input is always 1, and may act as a correction factor. By refraining from adding the bias vector corresponding to the original NN weight matrix M until after the two low-rank matrices have been multiplied by a given layer, the bias vector may remain an accurate correction factor. The process ends at block 314.

Before process 300, the matrix-vector product using $W_{m\times n}$ may require mn multiplications for each frame. The number of multiplications after utilizing the above low-rank approximation may instead be (m+n)r. As a result, the model size of the NN-based system may be significantly reduced if r is much smaller than n. The smaller the r value, the more efficient forward pass computations may be. This matrix approximation may be applied to any stage of the NN forward pass. However, when the output layer includes the largest number of nodes, the final hidden layer may be preferable as the greatest gains in speed may be achieved from approximating the largest NN weight matrix.

In some embodiments, limiting the dynamic range of a trained NN weight matrix may help in retraining the NN after this approximation. For example, back propagation is a method for training the neural network parameters, e.g., weight matrices, in a feed-forward neural network, such as the neural networks described above. The weights are adapted to a calculated error in the presence of certain inputs. The method is then applied backward from the final output layer through the hidden layers to the input layer. Reducing the dynamic range may help in training an NN because the larger the dynamic range, the slower the convergence in back propagation training. Reducing the dynamic range may also make quantization smaller.

In some embodiments, reduction of the dynamic range of a trained NN weight matrix may also improve fixed point scoring or fixed point approximation. This reduction may improve fixed point scoring as during forward pass, the approximation error due to fixed point scoring may be small. In addition, use of fixed point scoring may be preferable as it may be faster than standard floating point multiplications.

Learning Rate Adjustment of a Low-Rank Matrix Decomposition

As described above, the hidden layers of some neural networks may only be non-linear sigmoid hidden layers. These sigmoid layers may force the dynamic range of all hidden outputs to be between (0, 1). However, approximating an NN weight matrix representing connection weights between two such layers (or between a hidden layer and, e.g., the output layer) may introduce an intermediate linear hidden layer 218 into the ASR system. This intermediate linear hidden layer 218 may be linear (e.g., it may not have a dynamic range restricted to (0, 1)).

Figure 4:
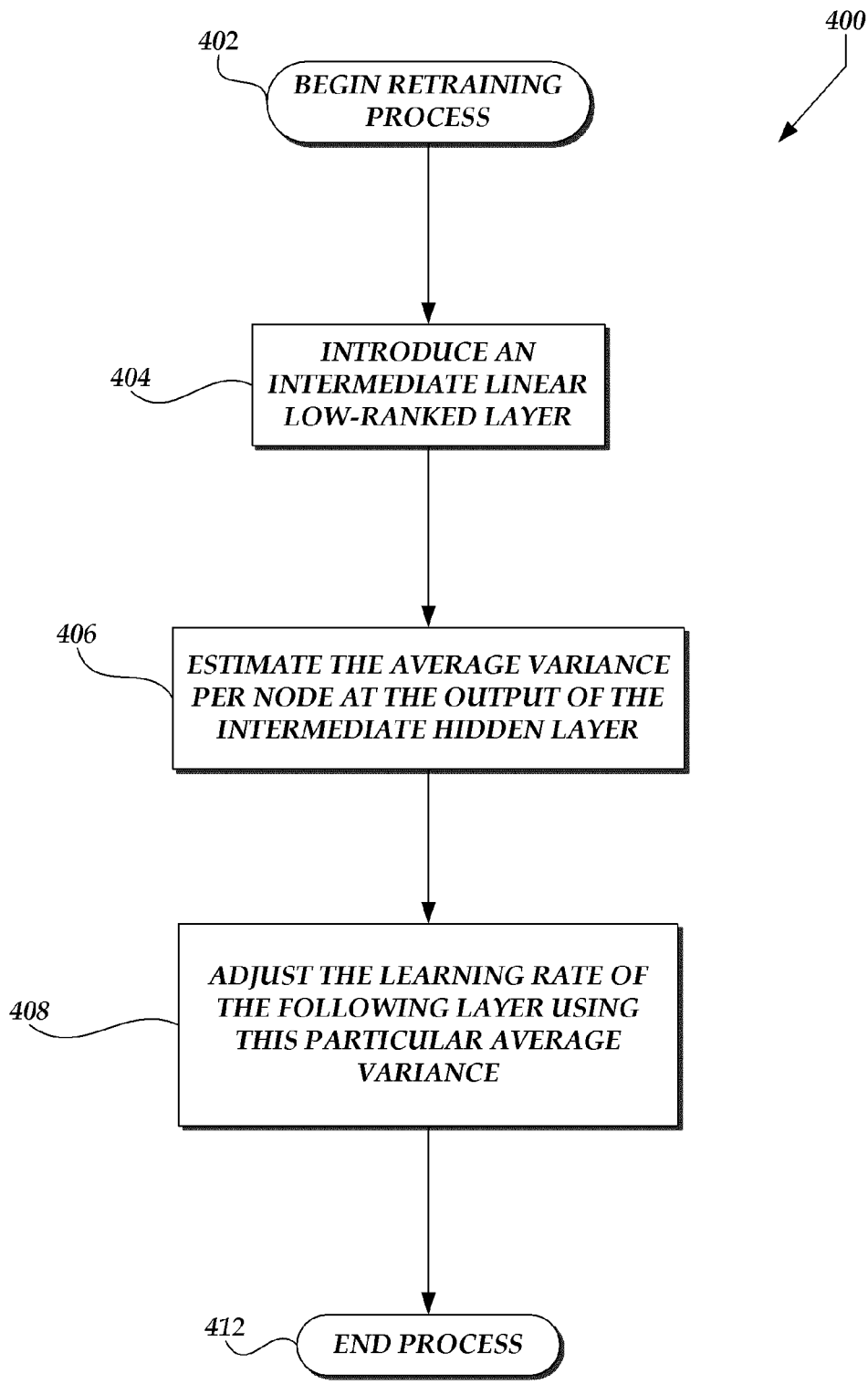
FIG. 4 is a flow diagram of an illustrative process for adjusting the learning rate of an approximated neural network matrix in order to recover from word error rate degradation.

In order to compensate for this newly introduced linear hidden layer, the learning rate may be adjusted during the retraining of the modified NN model. Retraining the NN model may be necessary to regain model accuracy after approximation. FIG. 4 depicts an illustrative process 400 for adjusting the learning rate during retraining.

The process begins at block 402. The process 400 may be embodied in a set of executable program instructions stored on a computer-readable medium, such as one or more disk drives, of a computer system. When the process 400 is initiated, the executable program instructions can be loaded into memory, such as RAM, and executed by one or more processors of the computing system.

Block 404 details the introduction of an intermediate linear layer 218, e.g., through approximating an NN weight matrix utilizing singular value decomposition as described in greater detail above. The original NN system may have one layer represented by a non-linear function, e.g., the parameters of the layer, and a corresponding weight matrix, W. By approximating the weight matrix, an intermediate layer 218 may be introduced wherein the layer is connected to the preceding layer by matrix B, and the following layer by matrix A.

In some embodiments, one may estimate the average variance per node at the output of this intermediate layer 218 as shown in block 406. This estimation assumes a constant variance for any non-linear node. This estimation may be made by assuming a fixed variance at each previous non-linear hidden output. The learning rate for each stage may differ, but the same learning rate may apply to each stage for each component for the sake of simplicity and to limit the number of necessary parameters.

The learning rate of the layer following the intermediate linear low-rank layer 218 may be adjusted at block 408. The learning rate may be adjusted to account for the changed average overall variance at the output of the intermediate hidden layer, as the output of the intermediate hidden layer may be included in the overall grading of the system. The typical learning rate for an NN system may be represented by $\alpha_W$. In order to match the dynamic range, the learning rate $\alpha_B$ of $[B_{m \times r}|b_{m \times 1}]$ component may be set to $$\alpha_B = \alpha_W \Big/ \sqrt{\frac{\text{trace}(A_{r \times n} A_{n \times r}^T)}{r}}, \quad [11]$$

where $\alpha_W$ represents the learning rate of the original NN component $[W_{m \times n}|b_{m \times 1}]$. The learning rate $\alpha_A$ of $[A_{r \times n}|0_{r \times 1}]$ component may be calculated by assuming a back-propagated error vector at any non-linear hidden layer to have a fixed variance in each dimension and may be set to $$\alpha_A = \alpha_W \Big/ \sqrt{\frac{\text{trace}(B_{r \times m}^T B_{m \times r})}{r}}. \quad [12]$$

The result of adjusting the learning rate at block 408 is that the dynamic range of the resultant stochastic gradient matches that of the original NN system. This adjustment may be effective when retraining the approximated NN model described above. Training the approximated NN model may allow the system to recover from WER degradation. The retrained approximated NN model may actually improve its WER over the original NN system. The process ends at block 412.

Sample Environment for Implementing a Neural Network-based ASR module

FIG. 5 illustrates an example environment in which a trained neural network using low-rank approximations for one or more weight matrices may be implemented. It depicts a spoken language processing system 500 and a client device 530. The spoken language processing system 500 can be a network-accessible system in communication with the client device 530 via a communication network 540, such as a cellular telephone network or the internet. A user 520 may use the client device 530 to submit utterances, receive information, and initiate various processes, either on the client device 530 or at the spoken language processing system 500. For example, the user 520 can issue spoken commands to the client device 530 in order to get directions or listen to music, as described above.

The client device 530 can correspond to a wide variety of electronic devices. In some embodiments, the client device 530 may be a mobile device that includes one or more processors and a memory which may contain software applications executed by the processors. The client device 530 may include a speaker or other audio output component for presenting or facilitating presentation of audio content. In addition, the client device 530 may contain a microphone or other audio component for accepting speech input on which to perform speech recognition. Illustratively, the client device 530 may include any computing devices such as wireless mobile devices (e.g. smart phones, PDAs, tablets, or the like), desktops, laptops, media player, video game platforms, electronic book readers, television set-top boxes, televisions (e.g., internet TVs), and computerized appliances, to name a few. The software of the client device 530 may include components for establishing communications over wireless communication networks or directly with other computing devices.

The spoken language processing system 500 can be any computing system that is configured to communicate via a communication network. For example, the spoken language processing system 500 may include any number of server computing devices, desktop computing devices, mainframe computers, and the like. In some embodiments, the spoken language processing system 500 can include several devices physically or logically grouped together, such as an application server computer device configured to perform speech recognition on an utterance and a database server computing device configured to store records and speech recognition models.

The spoken language processing system 500 can include an ASR module 502, an NLU module 504, data store 506, and one or more applications 508. In some embodiments, the spoken language processing system 500 can include various modules and components combined on a single device, multiple instances of a single module or component, etc. For example, the spoken language processing system 500 may include a separate database server that may be configured with a data store 506; a server or group of servers configured with both ASR and NLU modules 502, 504; and a server or group of servers configured with applications 508. In multi-device implementations, the various devices of the spoken language processing system 500 may communicate via an internal communication network 510, such as a corporate or university network configured as a local area network ("LAN") or a wide area network ("WAN"). In some cases, the devices of the spoken language processing system 500 may communicate over an external network, such as the Internet, or a combination of internal and external networks.

In some embodiments, the features and services provided by the spoken language processing system 500 may be implemented as web services consumable via a communication network 540. In further embodiments, the spoken language processing system 500 is provided by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The network 540 may be a publicly accessible network of linked networks, possibly operated by various distinct parties, such as the Internet. In other embodiments, the network 540 may include a private network, personal area network ("PAN"), LAN, WAN, cable network, satellite network, etc. or some combination thereof, each with access to and/or from the Internet. For example, the devices of the spoken language processing system 500 may be located within a single data center, and may communicate via a private network as described above. The client device 530 may communicate with the spoken language processing system 500 via the Internet. The client device 530 may have access to the Internet via a wired or WiFi connection, or via a cellular telephone network (e.g., a Long Term Evolution or LTE network).

The spoken language processing system 500 illustrated in FIG. 5 includes an ASR module 502 to process the utterance and transcribe what the user said. The ASR module 502 can output one or more likely transcriptions. For example, the ASR module 502 may output a lattice or N-best list of likely transcriptions. In some embodiments, the lattice or N-best list may include scores indicating a confidence in each transcription or portion thereof. The ASR module may include a neural network 100, such as a NN with low-rank approximations for a particular matrix. The spoken language processing system 500 may use an NLU module 504 to determine the user intent based on the output from the ASR module 502.

Various applications, such as the application 508 of FIG. 5, can use the output of the NLU module 504 to respond to user utterances or take actions in response to user utterances. Separate applications 508 may be implemented within the spoken language processing system 500 to perform different tasks. For example, the spoken language processing system 500 may include separate applications 508 for playing music, providing directions, performing searches, purchasing products, providing personal information management (e.g., calendars or contacts) and the like.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
under control of one or more computing devices configured with specific computer-executable instructions,
obtaining data defining an artificial neural network comprising a matrix, the matrix representing weights between a first layer and a second layer of the artificial neural network;
decomposing the matrix using singular value decomposition into a first component matrix, a second component matrix, and a third component matrix;
approximating the matrix as a product of first and second low-rank matrices using a portion of the first component matrix, a portion of the second component matrix, a portion of the third component matrix, and a rotation matrix,
wherein a rank of the first low-rank matrix is less than a rank of the matrix and a rank of the second low-rank matrix is less than the rank of the matrix,
wherein the first low-rank matrix corresponds to a product of the portion of the first component matrix, a square root of the portion of the second component matrix, and the rotation matrix, and
wherein the second low-rank matrix corresponds to a product of a transpose of the rotation matrix, the square root of a portion of the second component matrix, and a portion of the third component matrix;
inserting a third layer between the first and second layers of the artificial neural network wherein the first low-rank matrix represents weights between the first and third layers and the second low-rank matrix represents weights between the third and second layers; and
subsequently, retraining the artificial neural network for use as a speech recognition model.

2. The computer-implemented method of claim 1, further comprising approximating a second matrix of the artificial neural network as a second approximation of low-rank matrices using the rotation matrix.

3. The computer-implemented method of claim 1, wherein the second component matrix comprises a diagonal matrix comprising positive numbers on a diagonal, and wherein the positive numbers are sorted in descending order.

4. The computer-implemented method of claim 1, further comprising performing automatic speech recognition on features extracted from audio data of an utterance, wherein output of the artificial neural network comprises an acoustic score.

5. The computer-implemented method of claim 1, wherein the rotation matrix is randomly generated.

6. A system comprising:
a computer-readable memory storing executable instructions; and
one or more processors in communication with the computer-readable memory, wherein the one or more processors are programmed by the executable instructions to at least:
obtain data defining a neural network, the data comprising a first matrix representing weights between a first layer of the neural network and a second layer of the neural network;
generate a second matrix based at least in part on a rotation matrix and singular value decomposition component matrices of the first matrix, wherein the rotation matrix is separate from the singular value decomposition component matrices; and
insert a third layer between the first and second layers of the neural network, wherein the second matrix represents weights between the first and third layers, and wherein a third matrix represents weights between the third and second layers.

7. The system of claim 6, wherein the one or more processors are further programmed to retrain the neural network after the third layer has been inserted into the neural network.

8. The system of claim 7, wherein the one or more processors are further programmed to determine a learning rate for the retraining based at least partly on the third layer.

9. The system of claim 6, wherein the first layer comprises a hidden layer of the neural network and wherein the second layer comprises an output layer of the neural network.

10. The system of claim 6, wherein the one or more processors are further programmed to insert a fourth layer into the neural network using the rotation matrix.

11. The system of claim 6, wherein the rotation matrix reduces the dynamic range of the first and second matrices matrix with respect to the first matrix.

12. The system of claim 6, wherein the one or more processors are further programmed to decompose the first matrix into the singular value decomposition component matrices, wherein the singular value decomposition matrices comprise a first component matrix, a second component matrix, and a third component matrix, and wherein the second matrix corresponds to a product of a portion of the first component matrix, a square root of a portion of the second component matrix, and the rotation matrix.

13. The system of claim 12, wherein the second component matrix comprises a diagonal matrix comprising positive numbers on a diagonal, and wherein the positive numbers are sorted in descending order.

14. The system of claim 6, wherein the one or more processors are further programmed to add a bias vector to the first second matrix.

15. The system of claim 6, wherein the one or more processors are further programmed to provide the neural network to an automatic speech recognition service, wherein the neural network is configured to receive features extracted from audio data of an utterance as input.

16. One or more non-transitory computer readable media comprising executable code that, when executed, cause one or more computing devices to perform a process comprising:
obtaining data defining a neural network, the data comprising a first matrix representing weights between a first layer of the neural network and a second layer of the neural network;

generating a second matrix based at least in part on a rotation matrix and singular value decomposition component matrices of the first matrix, wherein the rotation matrix is separate from the singular value decomposition component matrices; and inserting a third layer between the first and second layer of the neural network, wherein the second matrix represents weights between the first and third layers, and wherein a third matrix represents weights between the third and second layers.

17. The one or more non-transitory computer readable media of claim 16, the process further comprising retraining the neural network after the third layer has been inserted into the neural network.

18. The one or more non-transitory computer readable media of claim 17, the process further comprising determining a learning rate for the retraining based at least partly on the third layer.

19. The one or more non-transitory computer readable media of claim 16, wherein the first layer comprises a hidden layer of the neural network and wherein the second layer comprises an output layer of the neural network.

20. The one or more non-transitory computer readable media of claim 16, the process further comprising inserting a fourth layer into the neural network using the rotation matrix.

21. The one or more non-transitory computer readable media of claim 16, wherein the rotation matrix reduces the dynamic range of the second matrix with respect to the first matrix.

22. The one or more non-transitory computer readable media of claim 16, the process further comprising decomposing the first matrix into the singular value decomposition component matrices, wherein the singular value decomposition matrices comprise a first component matrix, a second component matrix, and a third component matrix, and wherein the second matrix corresponds to a product of a portion of the first component matrix, a square root of a portion of the second component matrix, and the rotation matrix.

23. The one or more non-transitory computer readable media of claim 22, wherein the second component matrix comprises a diagonal matrix comprising positive numbers on a diagonal, and wherein the positive numbers are sorted in descending order.

24. The one or more non-transitory computer readable media of claim 16, the process further comprising adding a bias vector to the second matrix.

25. The one or more non-transitory computer readable media of claim 16, the process further comprising providing the neural network to an automatic speech recognition service, wherein the neural network is configured to receive features extracted from audio data of an utterance as input.

26. The one or more non-transitory computer readable media of claim 16, wherein the second matrix and the third matrix comprise numbers stored in fixed point.

27. The system of claim 12, wherein the third matrix corresponds to a product of the transpose of the rotation matrix, the square root of the portion of the second component matrix, and a portion of the third component matrix.

28. The one or more non-transitory computer readable media of claim 22, wherein the third matrix corresponds to a product of the transpose of the rotation matrix, the square root of the portion of the second component matrix, and a portion of the third component matrix.

* * * * *